United States Patent [19]
Borom et al.

[11] 3,710,625
[45] Jan. 16, 1973

[54] MINIATURIZED AUTOMATIC DECOMPRESSION METERS

[75] Inventors: Marcus P. Borom; Lyman A. Johnson, both of Schenectady, N.Y.

[73] Assignee: General Electric Company, Schenectady, N.Y.

[22] Filed: Sept. 16, 1971

[21] Appl. No.: 181,106

[52] U.S. Cl. ................................ 73/432 R, 73/300
[51] Int. Cl. ........................................... G01l 7/00
[58] Field of Search....73/432 R, 299, 300, 395, 406, 73/407

[56] References Cited

UNITED STATES PATENTS 3,121,333  2/1964  Alinari ........................... 73/299

FOREIGN PATENTS OR APPLICATIONS 735,170  5/1966  Canada ........................... 73/432

Primary Examiner—S. Clement Swisher
Attorney—Frank L. Neuhauser et al.

[57] ABSTRACT

A decompression meter in which a permselective membrane is used to simulate gas uptake and release by a diver's body tissues is miniaturized by filling the bourdon tube gauge chamber with liquid and providing a time-constant gas chamber between the ambient-pressure gas chamber and the gauge chamber.

6 Claims, 2 Drawing Figures

PATENTED JAN 16 1973 3,710,625

Inventors:
Marcus P. Borom,
Lyman A. Johnson,
by J. Watt
Their Attorney.

MINIATURIZED AUTOMATIC DECOMPRESSION METERS

The present invention relates generally to the art of computing decompression schedules and is more particularly concerned with a novel miniaturized pneumatic analogue decompression instrument which continuously senses ambient pressures experienced during hyperbaric exposure and computes and indicates a minimum-duration safe decompression schedule.

CROSS REFERENCES

This invention is related to those of the following four patent applications assigned to the assignee hereof and filed of even date herewith:

Patent application Ser. No. 181,048, filed Sept. 16, 1972 entitled, "Pneumatic Analogue Decompression Instrument," in the name of Marcus P. Borom, which discloses and claims the concept of using a permselective membrane to simulate the gas-diffusion characteristics of body tissues as they take up the gas of the breathing mixture and release it as ambient pressure varies.

Patent application Ser. No. 181,107, filed Sept. 16, 1972 entitled, "Multi-Time Constant Pneumatic Analogue Decompression Instruments," in the names of Lyman A. Johnson and Marcus P. Borom, which discloses and claims the concept of matching different time-constants of various body tissues with membrane chambers of different diffusion-controlled time-constant characteristics to provide a versatile decompression meter.

Patent application Ser. No. 181,099, filed Sept. 16, 1972 entitled, "Single Gauge Multi-Time Constant and Multi-Tissue Ratio Automatic Decompression Instruments," Johnson, the names of Marcus P. Borom and Lyman A. Johnson which discloses and claims the concept of connecting several different time-constant membrane assemblies in an automatic switching relation with a single gauge so that the gauge always indicates the highest pressure prevailing anywhere in the system.

Patent application Ser. No. 181,096, filed Sept. 16, 1972 entitled, "Combined Depth Gauge and Pneumatic Analogue Decompression Instrument," in the names of Marcus P. Borom and Lyman A. Johnson, which discloses and claims the concept of using a porous body both to provide the volume of the constant-volume gas chamber and to provide support for the semipermeable membrane and the gauge-sealing diaphragm. An additional feature is the coordinated depth gauge formed in the transparent cover of the instrument for read-out on the dial serving the decompression meter.

BACKGROUND OF THE INVENTION

The major hazard faced by both commercial and sport divers is decompression sickness which results from the release of dissolved gases from the body tissues as discrete bubbles when the ambient pressure is reduced too rapidly. As the ambient pressure is increased during a dive, the body tissues begin to absorb more gas from the breathing mixture to equilibrate with this pressure change. The rate of such equilibration varies from tissue to tissue, but not significantly from person to person, nor between compression and decompression phases, and is vitally important only in the course of return from hyperbaric exposure. Also, the tissues can withstand, to varying degrees, an internal over-pressure (i.e., supersaturation) during decompression without nucleating gas bubbles. This is referred to as a tissue ratio and is given by the expression $$\text{Tissue ratio} = \frac{\text{Safe maximum tissue pressure}}{\text{ambient pressure}}$$

with the pressures given on an absolute scale. The rate of descent, therefore, is a matter of the diver's choice while the rate of ascent is limited by a combination of the tissue ratio and the rate at which the dissolved gases enter the bloodstream in the dissolved state and are removed from the body through the lungs.

Boycott, Damant and Haldane ["The Prevention of Compressed-Air Illness," J. Hygiene, 8, 342–443 (1908)] proposed that the body tissues can be considered to be gas-diffusion chambers arranged in a parallel circuit with each chamber having a tissue ratio and a half-time characteristic of the equilibration rate of the tissue.

On the basis of their model, Boycott, et al. proposed a radical departure from the conventional continuous decompression schedules which became known as "-stage" decompression. Today, their model forms the basis for the modern decompression schedules as set forth in the Standard Navy Decompression Tables. These tables have been computed using tissue half-times of 20, 40, 80 and 120 minutes and tissue ratios from 2.5/1 to 1.8/1. These tables are designed for fixed mission dives, that is, dives to a predetermined depth for a predetermined time. Consequently, they are not suitable for the majority of commercial and sport dives since they prescribe a longer-than-necessary decompression schedule as the alternative to hazarding an estimate compensating for depth excursions during a dive.

Recognizing the need for a better answer to the problem, the prior art provided decompression meters having input, computation and read-out components of various kinds. In these devices, however, computation is accomplished by the resistive flow of a gas through an orifice or a porous medium which follows the mathematics of Poiseuille flow and not diffusion through a membrane. These devices, then, share the characteristic of inability to compute minimum-duration safe decompression schedules according to the Boycott et al. model. Thus, because of Poiseuille flow, tissue gas uptake and release actions are not computed according to the expressions used in developing the accepted decompression tables. The use of a diffusion membrane provides the precise analogue to these expressions.

SUMMARY OF THE INVENTION

The decompression instrument of this invention embodies new concepts which enable miniaturization of the instruments of copending application Ser. No. 181,048 by filling the bourdon gauge with a liquid and by providing a time-constant gas chamber of substantially constant volume between the bourdon tube and the ambient-pressure gas chamber. In this new system, the gas-diffusion membrane separares the latter two chambers, while the time-constant chamber is separated from the bourdon tube by a pressure-responsive means which fluid-tightly closes the bourdon tube. In accordance with this invention, these novel instruments may be either of the self-contained type or designed for connection in a breathing gas supply system downstream from the equalizer valve.

DESCRIPTION OF THE DRAWINGS

The novel concepts of this invention are illustrated in the drawings accompanying and forming a part of this specification, in which.

DESCRIPTION OF THE INVENTION

Figure 1:
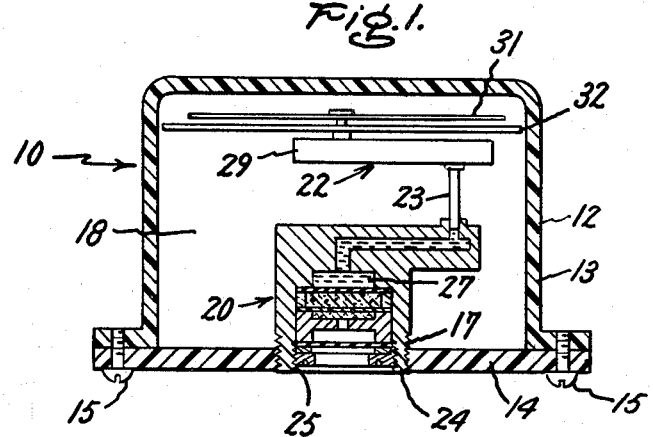
FIG. 1 is a vertical sectional view of a decompression instrument embodying this invention in preferred form; and, FIG. 2 is an enlarged vertical sectional view of the body of the FIG. 1 device showing components of the ambient pressure-sensing means, the computing means and the indicator means in assembled operating relation to each other.
Figure 2:
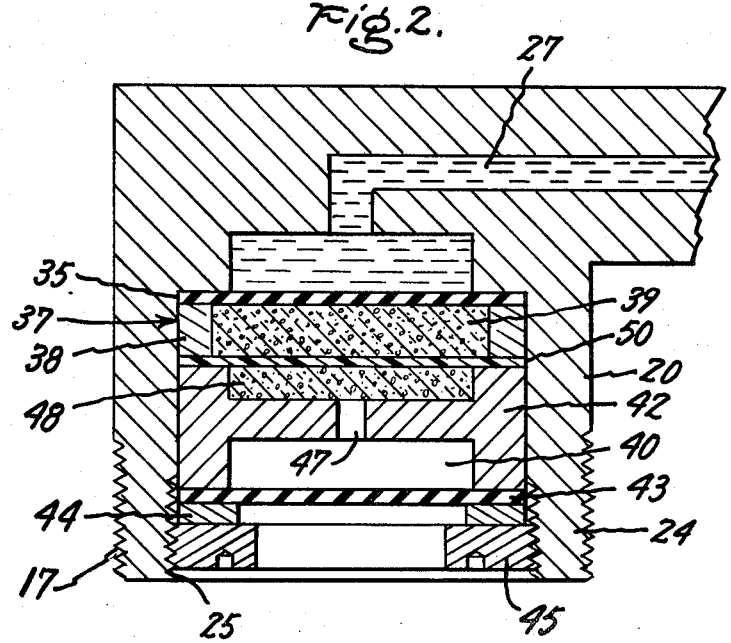

Self-contained instrument 10 of FIGS. 1 and 2 is enclosed in a housing 12 comprising a cover 13 in the form of a flanged cup-like body and a bottom plate 14 secured to cover 13 by bolts 15 through the flange of cover 13. The cover and bottom plate are made of transparent plastic (such as Lexan polycarbonate resin) having the physical strength to withstand the pressures encountered at diving depths. Plate 14 has a threaded axial aperture 17 providing access to instrument compartment 18 in the housing.

Instrument 10 includes an L-shaped metal body 20 and gauge assembly 22 supported by conduit 23 secured to body 20 which is supported within the housing by threaded engagement at its lower end 24 with bottom plate 14. An enlarged axial bore is provided in the lower end of body 20 to receive components of the ambient pressure-sensing means, the computing means and the indicator means of instrument 10, and threads 25 are provided within the lower open end of the body. A bore 27 of reduced diameter connects the inner end of the enlarged bore cavity with the upper end of body 20 where it communicates with conduit 23.

Bourdon tube 29 of gauge assembly 22 communicates with bore 27 through conduit 23 and as indicated in the drawings, the volume thus provided is liquid-filled. The bourdon tube is connected to indicator 31 and instrument dial 32 so that when pressure of liquid within tube 29 is changed, indicator 31 is caused to move relative to dial 32 and thereby show the pressure change on the dial.

The liquid within bourdon tube 29, conduit 23 and bore 27 is sealed against leakage into the enlarged bore portion of body 20 by diaphragm 35 of natural rubber. Diaphragm 35 is held in place by disc 37 which includes a metal ring 38 and a porous ceramic cylinder 39 which fills the space within the ring and provides the volume serving as the time-constant chamber of the computing means.

Ambient-pressure gas chamber 40 of this instrument is provided by metal cylinder 42 and a rubber diaphragm 43 which closes the lower open end of cylinder 42 and is held in place by washer 44 and compression nut 45. Cylinder 42 has a central portion through which a small diameter aperture 47 opens into a recess in the top of the cylinder where a porous ceramic disc 48 is disposed. A silicone rubber membrane 50 of about 10-mils thickness is disposed between the upper face of cylinder 42 and disc 48 and the opposed lower face ring 38 and ceramic cylinder 39. Thus, the diffusion membrane is supported against gas pressure differentials by the fritted glass or other suitable porous ceramic of cylinder 39 and disc 48 and at the same time is effective to diffuse gas species in either direction between chamber 40 and time-constant chamber 39.

As disclosed in copending application Ser. No. 181,048, the device of this invention may be provided in the form of the FIG. 3 instrument of that case so that it can be used in the breathing gas supply line of the diver instead of being self-sufficient. The modification of the device of FIGS. 1 and 2 hereof can suitably be substantially as shown and described in said application Ser. No. 181,048 rubber diaphragm 43 being replaced suitably by an inflexible disc and appropriate connection being made between the diver's breathing gas supply line (not shown) and ambient-pressure gas chamber 40.

It will also be understood by those skilled in the art that the particular membrane used for the gas-diffusion function of the instrument may be other than silicone rubber, which is disclosed above, the criteria for selection of alternative membrane materials being those set forth in the specification of application Ser. No. 181,048, the substance of that disclosure being incorporated herein by reference.

MODE OF OPERATION

The mode of operation of the instruments of this invention generally closely resembles that of the application Ser. No. 181,048. Thus, ambient-pressure gas chamber 40 fluctuates in volume according to changes in the water pressure applied to the diaphragm 43 and on compression, gas diffuses through membrane 50 into the time-constant gas chamber provided by cylinder 39, increasing the gas pressure therein and causing relative motion of diaphragm 35 and consequent displacement of liquid in bourdon tube 29. The bourdon tube is thereby actuated to indicate the increase of pressure in the gauge and indicator 31 is moved relative to calibrated dial 32 to show the gas pressure situation in the time-constant gas chamber and, hence, the pressure prevailing in the body tissues to which it is directly analogous. When a diver carrying this instrument experiences decompression in rising toward the surface of the water, gas diffusion through membrane 50 is in the other direction in response to the reduction in gas pressure in chamber 40. Then as gas pressure in the time-constant chamber is consequently diminished, liquid displacement in bourdon tube 29 is correspondingly reduced and indicator 31 moves to show the gas pressure change occuring in the time-constant chamber and the body tissue analogous thereto.

What we claim as new and desire to secure by Letters Patent of the United States is:

1. A decompression instrument which comprises,
   a. ambient pressure-sensing means including an ambient pressure gas chamber;

b. computer means comprising a time-constant gas chamber of substantially constant volume having a pressure port and a gas-diffusion membrane separating the time-constant gas chamber from the ambient-pressure gas chamber for measuring continuously uptake and release of gas by human tissues under fluctuating hyperbaric ambient pressures; and, c. indicator means including a gauge operatively associated with the computing means for indicating the appropriate decompression schedule in terms of hyperbaric pressures and time intervals, said gauge including a liquid-filled bourdon tube communicating with the pressure port of the time-constant gas chamber and pressure-responsive means fluid-tightly closing the bourdon tube and the said pressure port but being relatively movable in response to changes in gas pressure in the time-constant gas chamber.

2. The instrument of claim 1 in which the gas-diffusion membrane constitutes a common wall portion of the ambient-pressure gas chamber and the time-constant gas chamber.

3. The instrument of claim 2 in which the gas-diffusion membrane is a silicone rubber sheet of substantially uniform thickness of at least three mils.

4. The instrument of claim 1 in which the pressure-responsive means is a flexible diaphragm.

5. The instrument of claim 1 in which the pressure-responsive means is a thin rubber sheet.

6. A self-contained decompression meter for use by a scuba diver comprising, a. a submersible housing having a transparent portion and a water pressure port;

b. an ambient-pressure gas chamber in the housing;

c. pressure-responsive means water-tightly closing the ambient-pressure gas chamber and movable relative to the housing in response to fluctuation of water pressure in the water pressure port;

d. a time-constant gas chamber of substantially constant volume having a gas pressure port;

a gas-diffusion membrane constituting a common wall portion between the ambient-pressure gas chamber and the time-constant gas chamber to closely simulate the uptake and release of gas by a diver's tissues during an underwater excursion; and f. indicator means including a gauge operatively associated with the time-constant gas chamber for indicating the appropriate decompression time-pressure schedule, said gauge including a liquid-filled bourdon tube having its open end opposed to the pressure part of the time-constant gas chamber and pressure-responsive means fluid-tightly closing the bourdon tube and the said pressure port but being movable responsive to changes in gas pressure in the time-constant gas chamber.

* * * * *